Patented Jan. 22, 1935

1,988,921

UNITED STATES PATENT OFFICE 1,988,921

COATING COMPOSITION

Leroy E. Seng, Cleveland Heights, Ohio, assignor to The Union Products Company, Cleveland, Ohio, a corporation of Ohio No Drawing. Application November 15, 1932, Serial No. 642,817

3 Claims. (Cl. 134—1)

This invention relates to asphalt coating compositions particularly of the type wherein the asphalt is suspended in water.

I have discovered that the characteristics of the composition are greatly improved if a proportion of blue lead concentrate or equivalent is added. This concentrate is practically sublimed blue lead with a very small mixture of litharge to strengthen its rust-inhibiting qualities. Blue lead is a term applied to galena and also to the blue lead sulfide produced in the sublimation of galena. I have found that such material acts as a rust-inhibitor and inhibits the rusting of metallic surfaces when the composition is applied thereto.

For example, the composition may be made up as follows:—

| | Percent by weight |
|---|---|
| Asphalt | approximately 62 |
| Water | do 36.5 |
| Clay | do 1.5 |

The above material is used as a base and represents 96% of the total final composition. The balance of the composition consists of approximately 0.5% blue lead concentrate and approximately 1.5% of long fibre asbestos and approximately 2% of fibre (either wool or cotton). Pigments may be added to color the composition if desired.

The clay employed is preferably of a type capable of acting as an emulsifying agent such as Bentonite or Bollinger. The asphalt employed may be Trinidad or Mexican, Venezuelan or Californian. The latter are preferably steam-distilled residual asphalts. Other clays and asphalts may be employed. The proportions of materials may be varied somewhat. Instead of clay, resin soap may be employed as the emulsifying agent to form a so-called chemical emulsion. The amount of soap preferably employed is 1½% by weight, replacing the clay in the above formula.

The blue lead may be employed with or without the litharge content. In place of blue lead I may use red lead. The latter is not so effective as blue lead but has rust-inhibiting qualities. Litharge may also be employed alone, as this material is also a rust-inhibitor to some extent.

While I prefer to employ asbestos fibre and cotton or wool fibre, or equivalents of these three materials, these fibres may be omitted from the composition. When omitted the composition still operates effectively.

The asphalt, water and clay are mixed together first, at normal temperature, to form a base and then the blue lead concentrate, or equivalent, and other ingredients are added and the mixture stirred until the mass is substantially uniform throughout. The composition as so prepared is ready for application with brush, squeegee or air spray. It may be applied as such or admixed with Portland cement. The coat dries in about fifteen minutes and feels like rubber—soft, velvety, smooth and tough.

What I claim is:—

1. A coating composition of the kind described containing emulsified asphalt as the principal ingredient, water and blue lead in the proportion of about 0.5% based on the weight of the other ingredients.

2. A coating composition of the kind described containing asphalt emulsified with clay and water as the principal ingredient, and containing a rust-inhibitor selected from the group:— blue lead concentrate, red lead and litharge, the proportion of the inhibitor being about 0.5% for the blue lead concentrate and equivalent quantities for the litharge and red lead.

3. A composition according to claim 1 containing a fibrous material selected from the group:— asbestos, wool and cotton.

LEROY E. SENG.